June 11, 1968  J. V. WATSON  3,387,674

SINGLE FLIGHT AUGERS

Filed Nov. 2, 1966

INVENTOR
John V. Watson
BY
Wofford & Felsman
ATTORNEY

United States Patent Office 3,387,674
Patented June 11, 1968

3,387,674
SINGLE FLIGHT AUGERS
John V. Watson, 3904 Claridge Court,
Fort Worth, Tex. 76109
Filed Nov. 2, 1966, Ser. No. 591,608
4 Claims. (Cl. 175—394)

My invention relates in general to earth boring apparatus and in particular to apparatus of the auger type commonly used to drill shallow bore holes such as those used for constructing foundations for buildings. Augers used for forming bore holes in the earth may be broadly divided into two classes: (1) single flight augers and (2) double flight augers.

Single flight auger cutting apparatus has the advantage of fast penetration but has a number of significant disadvantages. One disadvantage is their instability during operation caused by their tendency to rotate about the gage point instead of the central axis of the auger. The gage point may be defined as the outermost point on the cutter blade which engages both the wall and the bottom of the bore hole. The resulting instability in operation of single flight augers may be cured by using a double flight in which two cutting edges 180 degrees apart simultaneously engage the bore hole bottom. Such apparatus tends to rotate consistently about the central axis of the auger but has other significant disadvantages. One disadvantage, for example, is that the penetration rate is normally decreased by increasing the linear length of cutter blade in contact with the bore hole bottom. Another disadvantage is that cuttings tend to jam in the narrow space separating the two auger flights near the bottom of the auger, particularly in the softer formations.

It is accordingly one object of my invention to provide a single flight auger with improvements such that it has a rotational stability comparable with that of double flight augers.

Another disadvantage of previously known single flight augers is that their penetration rates in certain formations can be sufficiently fast that the auger flights tend to become embedded in the wall of the hole in the manner of a corkscrew. There are often instances where it has been impossible to remove single flight augers from the hole in such circumstances. Such problems are most frequently encountered when relatively inexperienced personnel are in charge of the drilling equipment and do not recognize that the penetration rate of the auger can be too fast in some instances.

It is therefore another object of my invention to provide a single flight auger with means which prevents those extremely fast penetration rates in the softer formations that may cause the auger to become locked in the bore hole.

Another disadvantage of previously known single flight augers is that their manner of drilling frequently leaves the wall of the bore hole in a rough and incompletely formed condition. There may be regions on the wall of the hole which are untouched by the gage point of the cutter blade, thus causing the above-mentioned rough condition of the wall of the hole.

Another object of my invention is to provide improvements in single flight augers to insure that the wall of the hole is completely and smoothly formed.

The manner of attaching the generally horizontally or radially extending cutter blade to an auger has been less than completely satisfactory. Extremely large forces are generated on the cutter blade and it is essential that the attachment means be rugged and yet simple in operation.

It is therefore another object of my invention to provide improved means for securing cutter blades to augers.

These and other objects are effected by my invention and will be apparent from the following description taken in accordance with accompanying drawing, forming a part of this application, in which.

Figure 1:
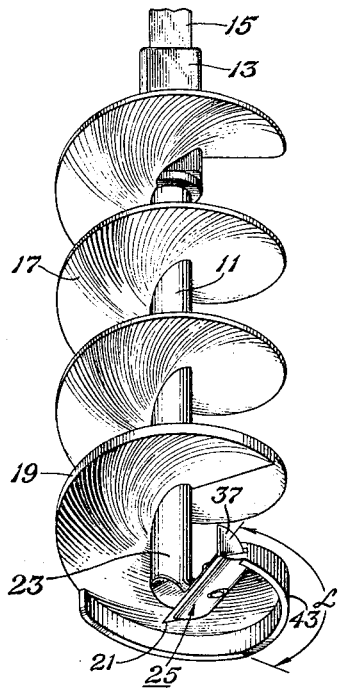
FIG. 1 is a perspective view of a single flight auger constructed in accordance with the principles of my invention.

The numeral 11 in the drawing designates a central, preferably cylindrical shaft having its upper end portion 13 adapted to be secured to a kelly bar 15, which depends from a drilling machine (not shown). A single flight spiral conveyor 17 is secured to the central shaft 11 by suitable means such as welding to extend along the length thereof as may be seen in FIG. 1. A lower step 19 of the auger flight is generally of greater thickness than the other steps since greater forces may be generated in this region.

In the embodiment of my invention shown in FIG. 1 a single edge cutter blade 21 extends substantially radially from the central or inner region of the apparatus and from the normally lower end 23 of the central shaft 11. Cutter blade 21 is secured to the apparatus by attachment means 25 which in this instance includes a clove foot casting 27 (see FIG. 3) having a slotted region 29 therein to receive the blade and provide support against both its lower and upper surfaces. The clove foot casting has an aperture 31 formed therein to receive fastener means such as bolt 33 which extends through the aperture 35 in the cutter blade. The bolt 33 may be secured in the assembled position by the nut 37 and lock washer 39.

Figure 4:
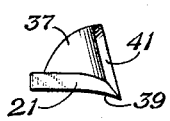
FIG. 4 is a side elevational view of a preferred form of cutter blade.
Figure 5:
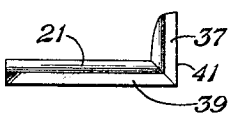
FIG. 5 is a front elevational view of the cutter blade of FIG. 4.
Figure 6:
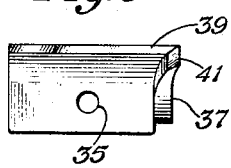
FIG. 6 is a plan view of the cutter blade of FIG. 4.

The cutter blade has a substantially vertical ear 37 extending upward from the outermost edge thereof to cut during drilling the wall of the bore hole. The vertical height of the ear should correspond to the depth of cut per revolution at the maximum penetration rate of the apparatus. A preferred construction of the cutter blade 21 and its vertically extending ear 37 may be seen in FIGS. 4 through 6. As shown in FIG. 4, the cutter blade has a downward sloping portion 39 at its forward edge that is sharpened to provide a good cutting edge. The forward edge 41 of the ear 37 is sharpened and intersects the sharpened downwardly sloping portion 39 of the blade as shown in FIGS. 5 and 6.

Figure 2:
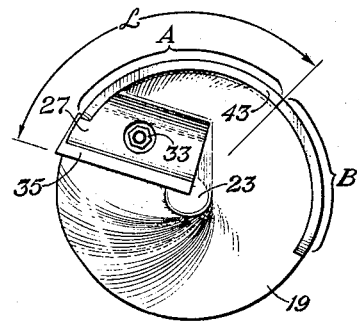
FIG. 2 is a bottom view of the single flight auger shown in FIG. 1.

A skirt 43 having the form of a truncated cylinder segment depends from the lower step 19 of the single flight spiral conveyor 17, and more particularly from the periphery thereof to terminate in a lower edge having a substantially horizontal region A spaced a selected distance above the cutter blade, and an obliquely extending region B which intersects the horizontal region A at a location from substantially 90 to 120 degrees from the outermost edge of the cutter, as indicated by the angle alpha in FIGS. 1 and 2. A skirt 43 having the configuration described and shown limits the penetration rate of the auger and stabilizes rotation thereof for reasons to be explained hereinafter.

Figure 3:
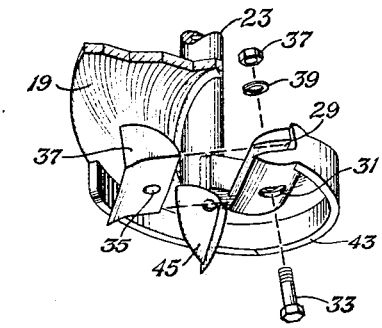
FIG. 3 is a fragmentary perspective view of a modified form of single flight auger which has a fishtail bit depending from its central shaft. This view also shows in better detail the attachment means used to secure the cutter blade to the auger, with the cutter blade and fastener element removed therefrom.

For best results it is preferable that a fishtail bit 45 as shown in FIG. 3 be used in combination with the above-described single flight auger. This fishtail bit should be of the type that converges toward a point on the central axis of the auger as shown. Such a device facilitates the removal of formation cuttings from the center of the hole where the linear speed of the metal of the cutter blade is exceptionally slow.

Use of apparatus as described above leads to significant advantages over previously known apparatus of the same general classification. The use of a single edge cutter and a single flight auger enables fast penetration rates of the apparatus but at the same time stability of rotation is achieved by use of the skirt 13. The horizontally extending region on the lower edge of the skirt establishes the maximum advance angle of the apparatus, which may be defined as the vertical penetration versus the hole circumference per revolution of the auger. Thus, region A of the skirt prevents those excessive penetration rates which cause auger flights to corkscrew into the hole and become immovably jammed therein. Since the radial thickness of the skirt may be made quite small, the penetration rates in the extremely soft formations where the corkscrew problem may not be so significant is not unduly retarded. Also, the utilization of horizontal region A on the skirt provides a large bearing area at an angular location alpha away from the gage point of the cutter that engages the wall of the hole and prevents the appaartus from tending to rotate about the gage point. This feature provides the stability of rotation which previously could be found when using double flight augers.

The utilization of the vertically extending ear 37 on the cutter blade enables the wall of the bore hole to be smoothly formed throughout the depth of the hole. This further facilitates the removal of the auger from the hole by keeping the wall of the hole completely clean and free from engagement with the periphery of the auger flights.

The attachments means described above which includes the clove foot arrangement with its upper and lower support for the cutting blade is a rugged arrangement which is characterized by its long life and relative freedom from maintenance. At the same time this attachment means is simple to operate since only one fastener means such as a nut and bolt need be utilized but nonetheless the cutter blade is securely fastened thereto.

The utilization of the single flight auger when constructed in accordance with the above teachings overcomes many disadvantages of previously known single flight augers, allows fast penetration rates in a controlled manner that prevents corkscrewing of the auger flights into the wall of the bore hole, while achieving the stability normally found only in double flight augers.

While I have shown my invention in only two of its forms it should be apparent to those skilled in the art that it is not so limited but is susceptible of various changes and modifications without departing from the spirit thereof.

I claim:

1. An auger type cutting apparatus comprising: a central shaft; a single edge cutter extending substantially radially from an inner region of the normally lower end of said shaft; a single flight spiral conveyor secured to said shaft to extend from said cutter toward the normally upper end of said shaft; a skirt having the form of a truncated cylinder segment depending from said single flight spiral conveyor along its outermost edge and terminating in a lower edge having a substantially horizontal region spaced a selected distance above said cutter to define the maximum advance angle of the apparatus and an oblique region which extends upward along the periphery of said spiral conveyor; and a substantially vertical ear extending upward from the outermost edge of said cutter to clean the wall of the bore hole as formed.

2. The apparatus defined by claim 1 in which the horizontal and oblique regions of said lower edge of said skirt intersect at a location from substantially 90 to 120 degrees from the gage point of the cutter.

3. The apparatus defined by claim 1 which further includes a cutter retainer having upper and lower support means that engage said cutter, and fastener means engaging and securing said cutter in said cutter support means.

4. The invention defined by claim 1 in which a fishtail drag bit is secured to the end of said shalt to cut the center of the bore hole.

References Cited

UNITED STATES PATENTS

| | | | |
|---|---|---|---|
| 228,044 | 5/1880 | Dine | 175—394 X |
| 2,217,258 | 10/1940 | Ruddell et al. | 175—394 X |
| 2,221,680 | 11/1940 | Parrish | 175—394 |
| 2,592,402 | 4/1952 | Erdahl | 175—394 X |
| 2,591,233 | 4/1952 | Browne | 175—394 X |
| 2,749,102 | 6/1956 | Goodrich | 175—392 |
| 2,838,285 | 6/1958 | Gredell | 175—394 X |
| 2,846,192 | 8/1958 | Ostling | 175—394 |

FOREIGN PATENTS

| | | |
|---|---|---|
| 1,065,074 | 5/1954 | France. |

OTHER REFERENCES

German printed application 6,138, Stihl et al.

CHARLES E. O'CONNELL, *Primary Examiner.*

R. E. FAVREAU, *Assistant Examiner.*

UNITED STATES PATENT OFFICE
CERTIFICATE OF CORRECTION

Patent No. 3,387,674     June 11, 1968

John V. Watson

It is certified that error appears in the above identified patent and that said Letters Patent are hereby corrected as shown below:

In the heading to the printed specification, lines 3 and 4, "3904 Claridge Court, Fort Worth, Tex. 76109" should read -- Fort Worth, Tex., assignor to Watson Manufacturing Company, Fort Worth, Tex. --.

Signed and sealed this 2nd day of December 1969.

(SEAL)
Attest:

Edward M. Fletcher, Jr.
Attesting Officer

WILLIAM E. SCHUYLER, JR.
Commissioner of Patents